Sept. 17, 1946. A. Y. DODGE 2,407,772
CLUTCH AND BEARING CONSTRUCTION
Filed June 16, 1943 2 Sheets-Sheet 1
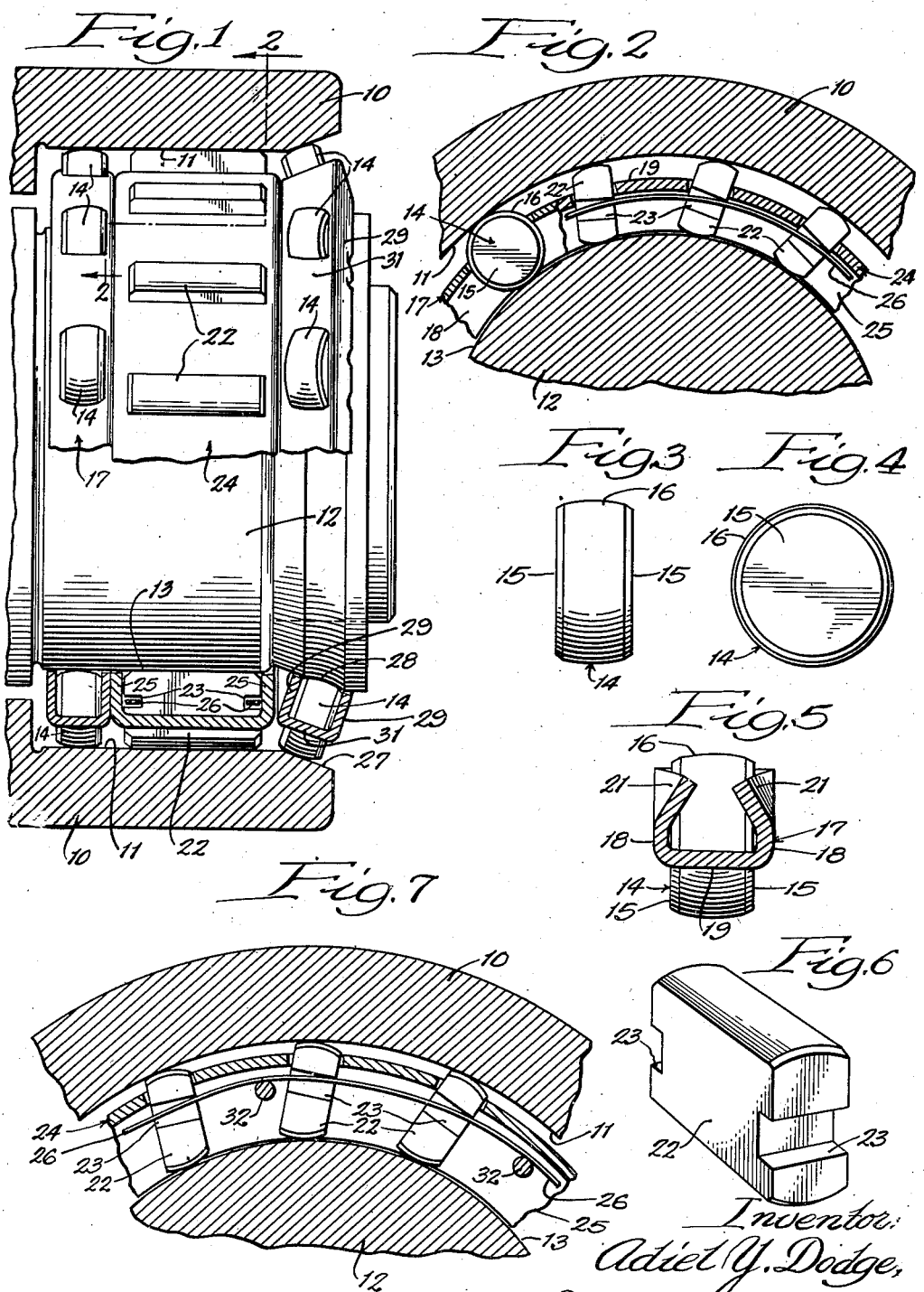
Inventor:
Adiel Y. Dodge,
By Dawson, Coons & Booth
Attorneys.

Sept. 17, 1946.　　　A. Y. DODGE　　　2,407,772
CLUTCH AND BEARING CONSTRUCTION
Filed June 16, 1943　　　2 Sheets-Sheet 2
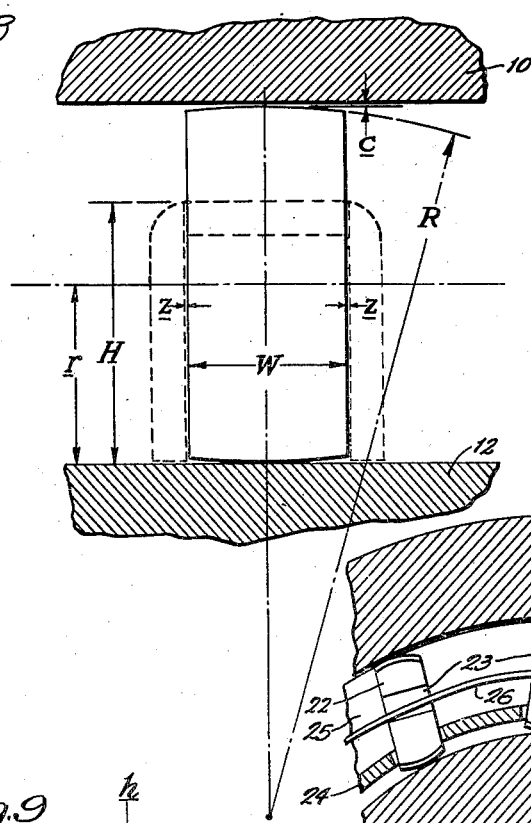
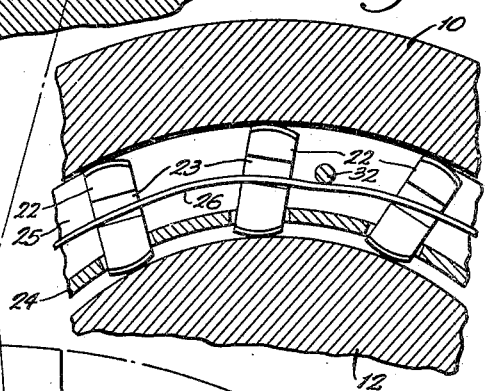
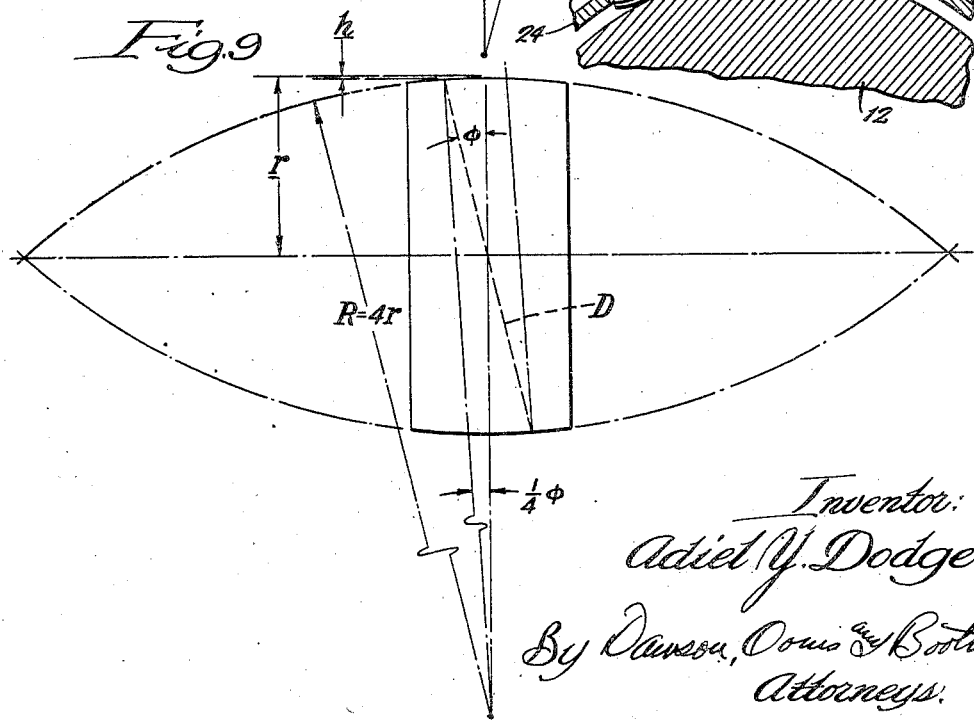
Inventor:
Adiel Y. Dodge,
By Dawson, Ooms and Booth
Attorneys.

Patented Sept. 17, 1946

2,407,772

UNITED STATES PATENT OFFICE 2,407,772

CLUTCH AND BEARING CONSTRUCTION

Adiel Y. Dodge, Rockford, Ill.

Application June 16, 1943, Serial No. 491,007

11 Claims. (Cl. 192—45.1)

This invention relates to clutch and bearing construction and more particularly to a device for connecting two coaxial races for free rotation in one direction and for locking them against relative rotation in the opposite direction.

One of the objects of the invention is to provide a clutch and bearing construction in which continuous race surfaces, preferably cylindrical, are connected by a bearing unit for free rotation and by tiltable grippers for driving connection in one direction and in which the operation of the grippers is not affected by the drag of the bearings.

Another object of the invention is to provide a construction wherein grippers and bearings working between the same continuous surfaces are supported by cages mounted closely adjacent in a minimum space but capable of independent rotation.

Still another object of the invention is to provide a clutch construction in which tiltable grippers are both supported in a cage and urged to gripping position by elongated springs.

A further object of the invention is to provide a clutch construction in which tiltable grippers are held in a cage by annular springs engaging grooves in the ends of the grippers, the springs being held in position by the sides of the cage.

Another object of the invention is to provide a clutch construction in which tiltable grippers are held in a cage and are evenly urged into engagement with the races by annular spring means secured in the cage at spaced points and passing through openings in the grippers.

The above and other objects and advantages of the invention will be more readily apparent from the following description when read in connection with the accompanying drawings, in which—

Figure 1 is an axial section with parts in elevation of a clutch and bearing construction embodying the invention;

Figure 2 is a partial section on the line 2—2 of Figure 1;

Figure 3 is a side elevation of a bearing roller;

Figure 4 is an end elevation of a bearing roller;

Figure 5 is a partially enlarged section illustrating the mounting of the bearing rollers in their cage;

Figure 6 is an enlarged perspective view of a gripper;

Figure 7 is a partial transverse section of an alternative clutch construction according to the invention;

Figures 8 and 9 are diagrams illustrating the construction of the bearing rollers; and Figure 10 is a view similar to Figure 7 of an alternative construction.

The unit illustrated in Figure 1 is adapted to connect an outer race 10 having a cylindrical inner working surface 11 to an inner race 12 having a complementary outer cylindrical surface 13. It will be understood that either race may be the driving member and that the races may be arranged for free rotation in either direction as desired.

In order to connect the races for free rotation, a bearing unit is mounted therebetween comprising a series of bearing rollers 14 shaped as best seen in Figures 3 and 4. Each of the rollers is of short axial length relative to its diameter and is preferably of a length about one-half of its diameter. I have found that any length greater than one-half the diameter does not increase the load carrying capacity of the roller which is optimum when the roller length is approximately one-half or slightly less than one-half its diameter. The end surfaces of the roller as shown at 15 are substantially flat and parallel to form supporting and guiding surfaces and its side surface as shown at 16 is slightly barrelled. The radius of the side surface 16 in a plane passing through the roller axis is preferably several times greater than its radius in a plane transverse to the axis so that the roller will act in effect very much like a ball of large diameter insofar as its bearing surface on the races is concerned, while occupying only a fraction of the space required by such a ball.

The rollers are supported in an annular cage 17 shown as formed of sheet metal channel shaped in cross section with parallel sides 18 and a web portion 19 formed with openings of slightly smaller circumferential length than the diameter of the rollers so that the rollers are separated by spaced parts of the web connecting the side portions. The side portions 18 have a running fit on the inner race and fit closely against the flat ends 15 of the rollers to support and guide the rollers. When not assembled between races, the rollers are held in the cage by engagement with the ends of the openings in the web 19 against radial outward movement and are prevented from moving radially inward in the cage by inwardly bent parts of the side portions 18 as shown at 21 to form inwardly extending projections engageable with the rollers to limit inward movement thereof.

Since the bearing rollers running on cylindrical races are guided almost entirely by the sides of the cage engaging the flat roller ends it is necessary that the clearance therebetween be such as to limit tilting of the rollers to an amount which will not cause excessive tightening or binding. It is also necessary that the cage be supported independently of the rollers and for this purpose the cage flanges form a close running fit on the inner cylindrical race. I have found that the maximum permissible clearance between the roller ends and the cage sides may be calculated as follows, referring to Figures 8 and 9:

Let $r$=radius of roller at right angles to roller axis and in the plane of rotation.
Let $R$=radius of roller at right angles to roller axis and in a plane 90° to the plane of rotation.
Let $c$=clearance between roller and races.
Let $z$=clearance at one side of roller between roller and cage.
Let $h$=height of chord of arc formed by R through angle $\frac{1}{2} \phi$.
Let $\phi$=any angle of tilt of roller.
Let $H$=height of cage.
Let $d=2r$.
Let $D$=the diameter of roller in a plane 90° to the plane of rotation, through angle $\phi$.
Let $R=4r$.

$2z$ must be an amount less than the amount which will allow roller to lean to an extent where $D=2r+c$. So D must be less than $2r+c$.

$$\frac{D}{2}=(r-h) \times \sec \phi$$

$$h=R-\left(\cos \frac{\phi}{4} \times R\right)$$

so $$\frac{D}{2}=\left[r-\left(R-\left(\cos \frac{\phi}{4} \times R\right)\right)\right] \times \sec \phi$$

Therefore $$2\left[r-\left(R-\left(\cos \frac{\phi}{4} \times R\right)\right)\right] \times \sec \phi$$

must be less than $2r+c$. $z$ controls the extent of $\phi$ tangent of $$\phi=\frac{2z}{H}$$

While the maximum clearance $2z$ which will control the rollers properly is expressed by the above equation, I prefer to design the rollers and cage to provide a clearance $2z$ about half that expressed by the equation.

Bearings per se as described above are more particularly described and claimed in my copending application, Serial No. 521,010, filed February 4, 1944.

The races are connected by a one-way clutch comprising a series of tiltable grippers 22 which may be of the type more particularly described and claimed in my copending application, Serial No. 479,695, filed April 19, 1943. The grippers as best seen in Figure 6 are formed with transverse grooves 23 in their opposite ends forming openings extending transversely through the grippers for a purpose to appear hereinafter.

The grippers are supported in an annular cage 24 which may be formed of sheet metal channel shaped in cross section to provide side rings 25 fitting closely adjacent the ends of the grippers and having openings in its web through which the grippers extend.

According to the present invention, the grippers are held in assembled position in the cage by annular flat wire springs 26 extending through the grooves 23 and held in place in the grooves by engagement with the side rings 25 of the cage. In assembling the grippers in the cage, the springs 26 may either be split rings so that the grippers can be assembled thereon successively and assembled through the openings in the cage from the inside or the springs may be continuous and may be deformed sufficiently to permit assembly of the grippers. Flat wire springs are preferable since they can be made sufficiently thin to give a low spring rate yet wide enough properly to engage the grooves.

With the grippers assembled and the springs 26 in place, it will be apparent that the grippers cannot be accidentally removed from the cage in either radial direction. At the same time the grooves 23 are so shaped that the spring 26 will engage the grippers adjacent one end of the groove as seen in Figure 2 and will tend to tilt the grippers to a position in which they engage the races.

The gripper cage is assembled as seen in Figure 1 closely adjacent the bearing cage but is detached therefrom so that it can rotate relative thereto. In operation, when the grippers are overrunning the bearing cage will be turned due to centrifugal force exerted by the grippers on this race. At this time sliding action between the inner ends of the gripper and the inner race is minimum so that the two races can turn relatively freely. Upon a reversal of direction the grippers will be tilted to engaged position to prevent relative rotation between the races, the springs 26 insuring that this action occurs promptly and that the grippers will engage the races uniformly throughout.

In the event that the unit is to absorb end thrust one or more bearing units as shown at the right of Figure 1 may be employed. This unit is adapted to operate between a conical surface 27 on the outer race and a complementary surface 28 on the inner race. As shown in Figure 1 the inner surface 28 is preferably grooved in order to guide the rollers. The bearing rollers are identical with those described above and have been given the same reference numerals but are supported in an annular cage having conical parallel sides 29 connected by a web portion 31 at right angles to the sides. With this cage construction, the bearing rollers will be held at an angle as shown so that they are capable of absorbing end thrust as well as straight radial load.

I have found that with bearing rollers of this character the action more nearly simulates that of a ball than of a roller and that the rollers can easily be guided by a slight guide pressure. Since their contact with the races is confined to the central portion they can easily be guided by a light side pressure and will not tend to become tilted so that they scuff the races. Thus a minimum of end thrust in the bearing operation is developed and narrow rollers occupying a minimum of space can be employed to carry relatively large bearing loads.

Figure 7 illustrates an alternative clutch construction similar to that of Figure 2 and parts therein corresponding to like parts in Figure 2 have been indicated by the same reference numerals. In this construction, in order to hold the springs in the cage and to insure uniform action thereof on the grippers, rigid supports are provided on the cage to engage the springs and to fix their position in the cage at spaced points. As shown, the supports are formed by cross rods 32 riveted or otherwise fastened rigidly in the cage and underlying the springs 26. The rods 32 are provided between alternate pairs of grippers so that the spring is uniformly supported throughout its length and will exert a uniform force on each of the grippers. Thus if there is any variation in gripper size the grippers will be uniformly acted on by the spring and will carry the same load in engaged position. Otherwise the clutch operation is substantially the same as that of Figures 1 and 2.

Figure 10 illustrates a construction similar to that of Figure 7 and parts therein corresponding to like parts in Figure 7 have been designated by the same reference numerals. In this construction the cage 24 is formed with its channel section opening outward and with its sides 25 having a running fit on the outer race. The grippers 22 are inserted from the outside and are held in place and urged to tilt by an annular spring 26 which tends to contract to urge the grippers inward. The ends of the spring may be overlapped sufficiently to form a complete annulus when it is assembled in the cage and cross rods 32 overlie the spring between alternate pairs of grippers to provide uniform spring action on the grippers as explained in connection with Figure 7.

While several embodiments of the invention have been shown and described in detail herein, it is to be understood that these are illustrative only and are not to be taken as a definition of the scope, reference being had for this purpose to the appended claims.

What is claimed is:

1. A combined clutch and bearing construction comprising inner and outer races having coaxial continuous facing surfaces, a series of anti-friction rollers between the surfaces connecting the races for free relative rotation, a cage for the rollers supporting them in spaced relation between the race surfaces, a series of tiltable grippers between the race surfaces tiltable in one direction to engage the surfaces and hold the races against relative rotation and in another direction to release the surfaces, and a cage for the grippers supporting them in spaced relation between the surfaces and mounted adjacent but rotatable relative to the bearing cage.

2. A combined clutch and bearing construction comprising inner and outer races having coaxial cylindrical facing surfaces, a series of anti-friction rollers between the surfaces connecting the races for free relative rotation, a cage for the rollers supporting them in spaced relation between the race surfaces, a series of tiltable grippers between the race surfaces tiltable in one direction to engage the surfaces and hold the races against relative rotation and in another direction to release the surfaces, and a cage for the grippers supporting them in spaced relation between the surfaces and mounted adjacent but rotatable relative to the bearing cage.

3. A combined clutch and bearing comprising inner and outer races having coaxial cylindrical facing surfaces, a series of bearing rollers between the surfaces relatively short with respect to their diameter and with their working surfaces substantially barrel shaped, a cage for the bearings having side rings engaging the ends of the bearings to guide them and cross members lying between adjacent bearings to hold them spaced, a series of tiltable grippers between the surfaces beside the bearing cage, and a cage for the grippers supporting them in spaced relation between the surfaces and lying closely adjacent but rotatable relative to the bearing cage.

4. A combined clutch and bearing comprising inner and outer races having coaxial cylindrical facing surfaces, a series of bearing rollers between the surfaces relatively short with respect to their diameter and with their working surfaces substantially barrel shaped, a cage for the bearings having side rings engaging the ends of the bearings to guide them and cross members lying between adjacent bearings to hold them spaced, a series of tiltable grippers between the surfaces beside the bearing cage, a cage for the grippers supporting them in spaced relation between the surfaces and lying closely adjacent but rotatable relative to the bearing cage, and means in the gripper cage to hold the grippers therein and to urge them yieldingly toward engaged position.

5. In a one-way clutch construction for connecting coaxial races, a series of tiltable grippers between the races each having a single transverse groove in its end, a cage having side rings lying closely adjacent the ends of the grippers and cross members rigidly connecting the side rings and lying between adjacent grippers to space them, and an annular spring fitting in the grooves in the gripper ends and held therein by the adjacent cage side ring to hold the grippers in the cage, the spring engaging each gripper adjacent one end of the groove therein to urge it to tilt in a direction to engage the races.

6. In a one-way clutch construction for connecting coaxial races, an annular cage of channel-shaped section having openings in its central portion, a series of tiltable grippers carried by the cage and projecting through the openings so that the edges of the openings space the grippers and limit tilting thereof, and an annular spring lying in the cage channel and passing through openings in the grippers to hold the grippers in the cage and to tilt them.

7. In a one-way clutch construction for connecting coaxial races, an annular cage of sheet material having a cylindrical central portion formed with spaced openings and inwardly extending side flanges, a series of tiltable grippers extending through the openings and projecting inwardly beyond the flanges, the flanges engaging the ends of the grippers to limit endwise movement thereof, and an annular spring lying between the flanges and passing through openings in the grippers to hold the grippers in the cage and to exert a tilting force thereon.

8. A one-way clutch for connecting inner and outer coaxial races comprising a series of tiltable grippers between the races having transverse openings therethrough, a cage supporting the grippers and having spaced cross members holding the grippers in spaced relationship, elongated spring means extending through the openings in the grippers and engaging the grippers adjacent one end of the openings to exert a tilting force thereon, and means rigid with the cage engaging and supporting the spring means between adjacent grippers.

9. A one-way clutch for connecting inner and outer coaxial races comprising a series of tiltable grippers between the races having transverse openings therethrough, a cage supporting the grippers and having spaced cross members holding the grippers in spaced relationship, an annular spring extending through the openings and engaging the grippers adjacent one end thereof to exert a tilting force thereon, and supporting means for the spring rigid with the cage and engaging the spring between adjacent grippers.

10. A one-way clutch for connecting inner and outer coaxial races comprising a series of tiltable grippers between the races having transverse openings therethrough, a cage supporting the grippers and having spaced cross members holding the grippers in spaced relationship, an annular spring extending through the openings and engaging the grippers adjacent one end thereof to exert a tilting force thereon, and supporting means for the spring rigid with the cage and underlying the spring between alternate pairs of grippers.

11. A one-way clutch comprising inner and outer races having radially spaced cylindrical surfaces, a series of tiltable grippers between the races to engage the race surfaces and connect the races, the grippers having transversely extending openings therein centrally of their radial widths, and an annular spring of smaller radial thickness than the radial extent of the openings extending therethrough and urging the grippers outward toward the outer race, the openings lying at such an angle that the springs engage one end thereof so that the outward spring force tends to tilt the grippers toward their engaged positions.

ADIEL Y. DODGE.